2,870,633

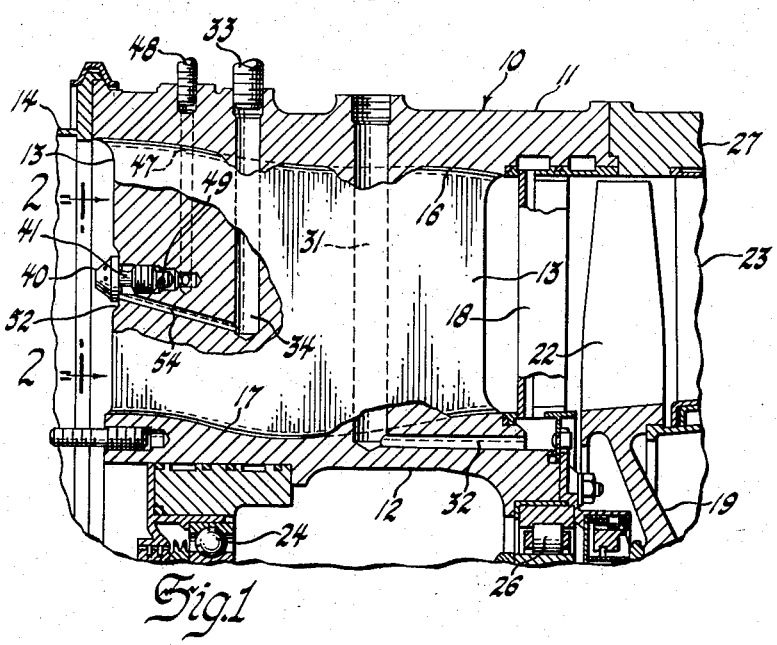
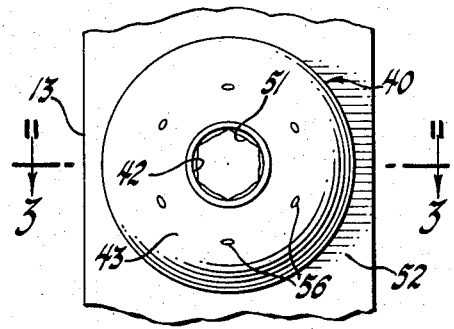
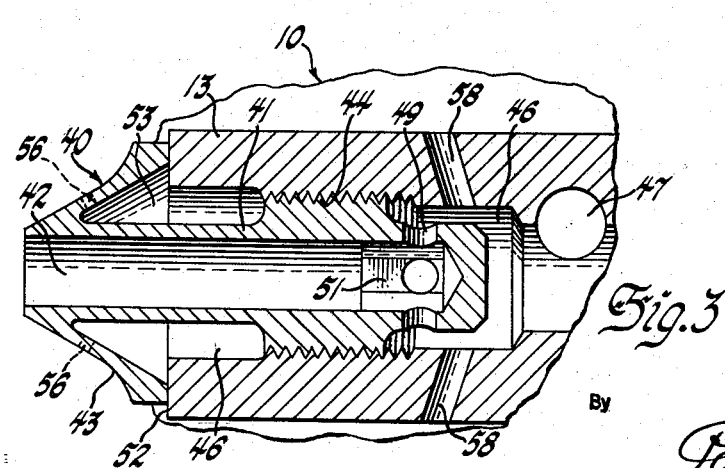

HEATED PRESSURE PROBE

William R. Harding and Charles J. McDowall, Indianapolis, Ind., assignors to General Motors Corporation, Detroit, Mich., a corporation of Delaware Application April 27, 1953, Serial No. 351,336

7 Claims. (Cl. 73—212)

Our invention relates to pressure probes for aircraft engines and the like and to the heating of such probes to prevent disabling accumulation of ice therein.

In gas turbine aircraft engines, for example, it is common practice to provide a pressure probe in the air inlet of the engine to receive an input of total pressure from the air entering the engine. The probe is connected by a suitable pressure connection to instruments or controls relating to the metering of fuel or otherwise to the operation of the engine. It is important that the proper operation of the probe and the controls connected thereto not be prevented by deposition of ice on the probe. However, a probe, particularly a total pressure probe, mounted in the inlet air stream is particularly susceptible to ice formation.

Our invention is directed to a pressure probe installation which is heated by circulation of hot air so that icing will not occur. The principal objects of the invention are to improve the operation of aircraft engines, to provide an improved pressure probe therefor, and to provide a hot air heated probe particularly adapted for installation in the inlets of aircraft engines.

The objects and advantages of the invention will be more fully understood by consideration of the succeeding detailed description of the preferred embodiments thereof.

Referring to the drawings:

Fig. 1 is a partial sectional view of the inlet section of an aircraft gas turbine engine, this section being taken in a plane containing the axis of the engine.

Fig. 2 is a detailed elevational view of the pressure probe taken in the direction indicated in Fig. 1.

Fig. 3 is a sectional view of the same taken on the plane indicated in Fig. 2.

Fig. 1 shows a part of the air inlet of a gas turbine engine with a probe according to the invention mounted therein. The air inlet is similar to that described in the copending application of Gaubatz et al., Serial No. 285,169, filed April 30, 1952 (Patent 2,800,273). The structure thereof is described herein to the extent that it is material to an understanding of this invention. The compressor inlet air conduit is defined by a body 10, commonly known as a forward frame, which may be a cast body comprising an outer shell 11, an inner shell 12, and struts or supports 13 extending between the shells. Air enters the left-hand end of the frame through a conduit fragmentarily indicated at 14 and passes between the inner and outer shells through the conduit defined by the inner surface 16 of the outer shell and the outer surface 17 of the inner shell. An annular row of guide vanes 18 mounted at the discharge end of the inlet imparts swirl to the air entering the compressor, which comprises a wheel 19 on which are mounted blades 22 and successive stages including annular rows of stator vanes 23 between the stages of the rotor. Bearings 24 and 26, mounted within the forward frame, support the engine shaft (not shown). The forward frame is mounted on the forward end of the compressor casing 27.

Hot air is supplied from any suitable source, such as a later stage of the compressor, in any suitable manner to provide heat for deicing the compressor inlet and to prevent formation of ice on the pressure sensing probe 40 mounted in the leading edge of one of the struts 13, which constitutes a support for the probe. The hot air may be brought in in any suitable way to a radial passage 31 in the strut from which it flows through passage 32 to the guide vanes 18 as described in the aforementioned Gaubatz et al. application. Hot air which may be from the same source is supplied in any suitable manner as, for example, through a pipe fragmentarily indicated at 33 to a second radial passage 34 in the strut.

Referring more particularly to Figs. 2 and 3 for an understanding of the structure of the pressure probe 40 and the manner in which it is heated, the probe comprises a one-piece metallic body the principal parts of which are a tube 41 defining therewithin a passage or chamber 42 partially closed at one end and a retroverted flange, cap, or head 43. The body of the probe is threaded at 44 and is received in a threaded cavity or opening 46 extending into the leading edge of the strut 13 parallel to the direction of air flow. The inner end of cavity 46, constituting a pressure chamber, is closed but is intersected by a pressure connection passage 47 extending to a pipe or other further connection 48 by which the pressure sensed by the probe is communicated to the actuated instrument or device. The total pressure is developed in the chamber or passage 42 from which it is communicated to passages 46 and 47 through radial ports or passages 49 in the inner end of the tubular body 41 of the probe. It may be noted that the inner end of the passage or chamber 42 is of hexagonal cross section as indicated at 51 so that the probe may be screwed into place with a standard wrench.

The conical cap or flange 43 abuts a flattened surface 52 on the forward face of the strut 13 to define a chamber or space 53 for hot air between the flange 43 and tube 41 and between the wall of the cavity 46 and the tube 41. Hot air is bled to this chamber 53 through the passage 34 (Fig. 1) and a branch passage 54 intersecting the passage 34 and entering the cavity 46 near the leading edge of the strut.

The hot air flows from the probe through holes 56 at the forward end of the chamber 53 from which it may flow rearwardly with the compressor inlet air over the outer surface of the cap 43. Thus, both the tube 41 which defines the chamber 42 and the flange 43 about the entrance to it are adequately heated to prevent the formation of ice which might clog and disable the probe. Any atmospheric water entering chamber 42, or atmospheric ice entering and melting in the chamber to form water, leaves the chamber through restricted passages 58 extending from the rear part of the bore 46 through the side walls of the strut. These passages are much smaller than the openings 49 and the bore of the chamber 42 so that no significant pressure error results from the bleeding out of air and water through these passages 58.

The body 40 is preferably of a metal, such as an aluminum bronze, of good heat conductivity.

As will be seen, the invention provides not only a very simple and readily manufactured and installed probe structure but one which is particularly efficient in that a very substantial amount of heat can be easily imparted to the probe. The heating air may be turned on or left on at all times, or may be turned on by the pilot or automatically either independently of or in connection with the supply of deicing air to the compressor inlet.

The detailed disclosure herein of the preferred embodiment of the invention for the purpose of explaining the principles thereof is not to be considered as limiting the invention, since many modifications of structure may be made by the exercise of skill in the art without departing from the principles of the invention.

We claim:

1. In combination, an air conduit, a support extending into the space within the conduit having a cavity therein opening into the space within the air conduit, and a pressure probe mounted on the support extending from the exterior of the support into the cavity and including a portion closing the cavity to define an inner chamber remote from the surface of the support, a pressure connection in the support communicating with the inner chamber, the probe having a passage therein communicating with the inner chamber and opening into the space within the conduit exterior to the support, the probe including a flange adjacent the opening of the passage in the probe, disposed over the cavity, partially spaced from the support and having a rim portion in contact with said support to define an outer chamber, and the support defining a passage for supplying hot fluid communicating with the outer chamber.

2. In combination, an air conduit, a support extending into the space within the conduit having a cavity therein opening into the space within the air conduit, and a pressure probe mounted on the support extending from the exterior of the support into the cavity and including a portion closing the cavity to define an inner chamber remote from the surface of the support, a pressure connection in the support communicating with the inner chamber, the probe having a passage therein communicating with the inner chamber and opening into the space within the conduit exterior to the support, the probe including a flange adjacent the opening of the passage in the probe, disposed over the cavity, partially spaced from the support and having a rim portion in contact with said support to define an outer chamber, the support defining a passage for supplying hot fluid communicating with the outer chamber, and the flange having holes therethrough adjacent the opening of the passage providing outlets for the hot fluid from the outer chamber.

3. In combination, an air conduit, a support extending into the space within the conduit having a cavity therein opening into the space within the air conduit, a pressure probe mounted on the support extending from the exterior of the support into the cavity and including a portion dividing the cavity into an outer chamber adjacent the surface of the support and an inner chamber more remote from the surface of the support, the support defining a pressure connection communicating with the inner chamber and a passage for supplying hot fluid communicating with the outer chamber, the probe having a passage therein communicating with the inner chamber and opening into the space within the conduit exterior to the support, the probe including a flange adjacent the opening of the passage in the probe, disposed over the cavity and closing the outer chamber, and means providing an outlet for the hot fluid from the outer chamber.

4. In combination, an air conduit, a support extending into the space within the conduit having a cavity therein opening into the space within the air conduit, and a pressure probe mounted on the support extending from the exterior of the support into the cavity and including a portion dividing the cavity into an outer chamber adjacent the surface of the support and an inner chamber more remote from the surface of the support, the support defining a pressure connection communicating with the inner chamber and a conduit for supplying hot fluid communicating with the outer chamber, the probe having a passage therein communicating with the inner chamber and opening into the space within the conduit exterior to the support, the probe including a flange adjacent the opening of the passage in the probe, disposed over the cavity and closing the outer chamber, the flange having holes therethrough adjacent the opening of the passage providing outlets for the hot fluid from the outer chamber.

5. A pressure sensing device comprising, in combination, a support having an opening therein, a pressure probe comprising a body mounted in the opening and including a flange at one end of the body external to the support closing the opening, the probe having a chamber therein with a fluid entrance, a pressure connection in the support communicating with the chamber, the body being spaced in part from the support adjacent the said entrance to define with the support a portion of said opening as a heating fluid space disposed around the body adjacent the chamber, the probe having an aperture therein communicating with the said space to provide an outlet therefrom, and the support having a passage therein for supplying hot fluid communicating with the said space.

6. A pressure sensing device comprising, in combination, a support having an opening therein, a pressure probe comprising a body mounted in the opening and including a flange at one end of the body external to the support closing the opening, the probe having a chamber therein with a fluid entrance, a pressure connection in the support communicating with the chamber, the body being spaced in part from the support adjacent the said entrance to define with the support a portion of said opening as a heating fluid space disposed around the body adjacent the chamber, the probe having apertures in the flange distributed around the said entrance communicating with the said space to provide outlets therefrom adjacent the said entrance and the support having a passage therein for supplying hot fluid communication with the said space.

7. A pressure sensing device comprising, in combination, a support having an opening therein, a pressure probe comprising a body mounted in the opening and including a flange at one end of the body external to the support closing the opening, the flange being conical and reverted over the body, the probe having a chamber therein with a fluid entrance, a pressure connection in the support communicating with the chamber, the body being spaced in part from the support adjacent the said entrance to define with the support a portion of said opening as a heating fluid space disposed around the body adjacent the chamber, the probe having apertures in the flange thereof communicating with the said space to provide outlets therefrom adjacent the said entrance, and the support having a passage therein for supplying hot fluid communicating with the said space.

References Cited in the file of this patent

UNITED STATES PATENTS

| | | |
|---|---|---|
| 2,179,500 | Diehl | Nov. 14, 1939 |
| 2,482,701 | Anderson | Sept. 20, 1949 |
| 2,634,049 | Hodges et al. | Apr. 7, 1953 |
| 2,655,141 | Hayden | Oct. 13, 1953 |
| 2,706,408 | Holbrook | Apr. 19, 1955 |